United States Patent
Khude et al.

(10) Patent No.: US 11,039,339 B1
(45) Date of Patent: Jun. 15, 2021

(54) WLAN WITH DISTRIBUTED ACCESS POINT FUNCTIONALITY

(71) Applicant: NXP USA, Inc., Austin, TX (US)

(72) Inventors: Nilesh N. Khude, Pune (IN); Vijay Ahirwar, Pune (IN); Ankit Sethi, Pune (IN); B Hari Ram, Chennai (IN); Vijay Ganwani, Pune (IN); Sayak Roy, Kolkata (IN); Sri Varsha Rottela, Visakhapatnam (IN)

(73) Assignee: NXP USA, Inc., Austin, TX (US)

(*) Notice: Subject to any disclaimer, the term of this patent is extended or adjusted under 35 U.S.C. 154(b) by 14 days.

(21) Appl. No.: 16/702,602

(22) Filed: Dec. 4, 2019

Related U.S. Application Data

(60) Provisional application No. 62/776,831, filed on Dec. 7, 2018.

(51) Int. Cl.
*H04W 28/06* (2009.01)
*H04W 80/02* (2009.01)
*H04W 92/24* (2009.01)
*H04W 84/12* (2009.01)

(52) U.S. Cl.
CPC .......... *H04W 28/06* (2013.01); *H04W 80/02* (2013.01); *H04W 84/12* (2013.01); *H04W 92/24* (2013.01)

(58) Field of Classification Search
CPC ..... H04W 28/06; H04W 80/02; H04W 84/12; H04W 92/24; H04W 52/02; H04W 40/02; H04L 12/28
See application file for complete search history.

(56) References Cited

U.S. PATENT DOCUMENTS

| 7,797,016 B2 | 9/2010 | Eran et al. |
| 2008/0026738 A1* | 1/2008 | Jiang ................. H04L 47/30 455/418 |
| 2009/0043911 A1* | 2/2009 | Flammer ............. H04L 45/00 709/238 |
| 2010/0046471 A1* | 2/2010 | Hattori ............. H04L 12/4633 370/331 |

OTHER PUBLICATIONS

WI-FI Alliance, "Multi-AP Specification", version 1.0, pp. 1-66, Jun. 18, 2018.

* cited by examiner

*Primary Examiner* — Wei Zhao

(57) ABSTRACT

A wireless local area network (WLAN) system includes a plurality of access points and a WLAN server. Each access point includes a wireless transceiver, which transmits and receives data packets to and from client stations (STAs) in the WLAN system, and is connected to a wired local area network (LAN). First encapsulation logic in the access point encapsulates the data packets received by the wireless transceiver, including the MAC headers and payloads, in data frames and transmits the data frames over the LAN. The WLAN server receives the data frames transmitted over the wired LAN from the access points. Second encapsulation logic in the WLAN server decapsulates the received data packets from the received data frames. A MAC processor in the WLAN server applies MAC processing functions to the MAC headers and payloads of the decapsulated data packets.

20 Claims, 5 Drawing Sheets

WLAN WITH DISTRIBUTED ACCESS POINT FUNCTIONALITY

CROSS-REFERENCE TO RELATED APPLICATION

This application claims the benefit of U.S. Provisional Patent Application 62/776,831, filed Dec. 7, 2018, which is incorporated herein by reference.

FIELD OF THE INVENTION

The present invention relates generally to wireless local area networks (WLANs), and particularly to apparatus and methods for implementing access point functionality in a WLAN.

BACKGROUND

In conventional Wi-Fi® deployments, each access point (AP) includes its own physical layer (PHY) and media access control (MAC) interfaces, enabling it to communicate independently with client stations (STAs) in accordance with the applicable IEEE 802.11 WLAN specifications. The APs connect to a backhaul network, such as a wired Ethernet network, for purposes of data exchange and Internet access.

Recently, the Wi-Fi Alliance has established a number of new standards for multi-AP networks, in which multiple APs, deployed at different locations in a facility (such as a home or office) work together to extend Wi-Fi coverage and enhance quality of service. The relevant standards are summarized in the Wi-Fi Alliance Multi-AP Specification (version 1.0, released Jun. 18, 2018), which is available at wi-fi.org. The APs in a multi-AP network are centrally controlled by a multi-AP controller over a backhaul network. Each AP, however, still maintains its own, respective basic service set (BSS) and implements the full range of PHY and MAC functions required by the relevant IEEE 802.11 specifications.

Another scheme for central management of access points in a WLAN is described in U.S. Pat. No. 7,797,016. This patent describes a method in which a plurality of access points are arranged in a WLAN to communicate over the air with a mobile station using a common basic service set identification (BSSID) for all the access points. Upon receiving at one or more of the access points an uplink signal transmitted over the WLAN by the mobile station using the common BSSID, messages are sent and received over a communication medium linking the access points in order to select one of the access points to respond to the uplink signal. The selected one of the access points transmits a response to the mobile station.

SUMMARY

Embodiments of the present invention that are described hereinbelow provide improved WLAN systems and methods for communication in such systems.

There is therefore provided, in accordance with an embodiment of the invention, a wireless local area network (WLAN) system, including a plurality of access points. Each access point includes a wireless transceiver, which is configured to transmit and receive data packets, including respective medium access control (MAC) headers and payloads, over the air to and from client stations (STAs) in the WLAN system, a first backbone network interface, which is configured to be connected to a wired local area network (LAN), and first encapsulation logic, which is configured to encapsulate the data packets received by the wireless transceiver, including the MAC headers and payloads, in data frames and to transmit the data frames over the LAN via the first backbone network interface. A WLAN server in the WLAN system includes a second backbone network interface, which is configured to be connected to the wired LAN and to receive the data frames transmitted over the wired LAN from the access points, second encapsulation logic, which is configured to decapsulate the received data packets from the received data frames, and a MAC processor, which is configured to apply MAC processing functions to the MAC headers and payloads of the decapsulated data packets.

In some embodiments, the wireless transceiver is configured, upon receiving a data packet from a STA, to transmit an acknowledgment packet over the air to the STA while the encapsulation logic encapsulates the received data packet for transmission over the LAN. In a disclosed embodiment, the data packets include an error detection code, and wherein the access point is further configured to verify an integrity of the received data packet using the error detection code.

Additionally or alternatively, the MAC processor is further configured to apply the MAC processing functions in order to generate the MAC headers of the data packets that are to be transmitted by the access points over the air to the STAs, and the second encapsulation logic is configured to encapsulate the data packets, including the generated MAC headers, in further data frames for transmission over the wired LAN to the access points. The first encapsulation logic is configured to decapsulate the further data frames received by the first backbone network interface from the wired LAN, and to pass the decapsulated data packets, including the generated MAC headers, to the wireless transceiver for transmission to a STA.

In a disclosed embodiment, the MAC processor is configured to receive information from the access points regarding respective locations of the STAs in the WLAN system, and to select the access points to transmit the data packets to the STAs responsively to the respective locations.

Additionally or alternatively, the MAC processor is configured to convey to the access points, together with the data packets for transmission over the air to the STAs, instructions with respect to encoding, beamforming and quality of service (QoS) for application by the wireless transceiver in transmitting the data packets to the STAs.

Further additionally or alternatively, the wireless transceiver is configured to assess an availability of a wireless channel in the WLAN system before transmitting the data packets to the STAs.

In a one embodiment, the access points are configured to draw electrical power, via the first backbone network interface, from cabling of the wired LAN.

In a disclosed embodiment, the access points have respective basic service sets (BSSs) and are configured to associate with the STAs, using the respective BSSs, in response to instructions conveyed over the wired LAN from the WLAN server to the access points. Additionally or alternatively, the WLAN server further includes a wide area network (WAN) interface, which is configured to be coupled to a public network, and the MAC processor is configured to convey communications between the STAs and the public network via the access points.

There is also provided, in accordance with an embodiment of the invention, a method for communicating over a wireless local area network (WLAN). The method includes coupling a plurality of access points to communicate over a wired local area network (LAN) with a WLAN server, each access point including a wireless transceiver configured to transmit and receive data packets, including respective medium access control (MAC) headers and payloads, over the WLAN to and from client stations (STAs). In each of the access points, the data packets received by the wireless transceiver from the STAs, including the MAC headers and payloads, are encapsulated in data frames, and transmitting the data frames over the wired LAN to the WLAN server. In the WLAN server, the received data packets are decapsulated from the received data frames. MAC processing functions are applied to the MAC headers and payloads of the decapsulated data packets in the WLAN server.

In a disclosed embodiment, the method includes generating by the WLAN server data packets for transmission by the access points over the air to the STAs with respect to processes of association, authorization and authentication (AAA).

There is additionally provided, in accordance with an embodiment of the invention, an access point for operation in a wireless local area network (WLAN) system. The access point includes a wireless transceiver, which is configured to transmit and receive data packets, including respective medium access control (MAC) headers and payloads, over the air to and from client stations (STAs) in the WLAN system. A backbone network interface is configured to be connected to a wired local area network (LAN). Encapsulation logic is configured to encapsulate the data packets received by the wireless transceiver, including the MAC headers and payloads, in data frames and to transmit the data frames over the LAN via the backbone network interface to a WLAN server, which receives the data frames transmitted over the wired LAN from the access points, decapsulates the received data packets from the received data frames, and applies MAC processing functions to the MAC headers and payloads of the decapsulated data packets.

There is further provided, in accordance with an embodiment of the invention, a server for operation in a wireless local area network (WLAN) system including a plurality of access points, each access point being configured to transmit and receive data packets, including respective medium access control (MAC) headers and payloads, over the air to and from client stations (STAs) in the WLAN system, and to encapsulate the received data packets, including the MAC headers and payloads, in data frames and to transmit the data frames over a wired local area network (LAN). The server includes a backbone network interface, which is configured to be connected to the wired LAN and to receive the data frames transmitted over the wired LAN from the access points. Encapsulation logic is configured to decapsulate the received data packets from the received data frames. A MAC processor is configured to apply MAC processing functions to the MAC headers and payloads of the decapsulated data packets.

The present invention will be more fully understood from the following detailed description of the embodiments thereof, taken together with the drawings in which:

DETAILED DESCRIPTION OF EMBODIMENTS

Figure 1:
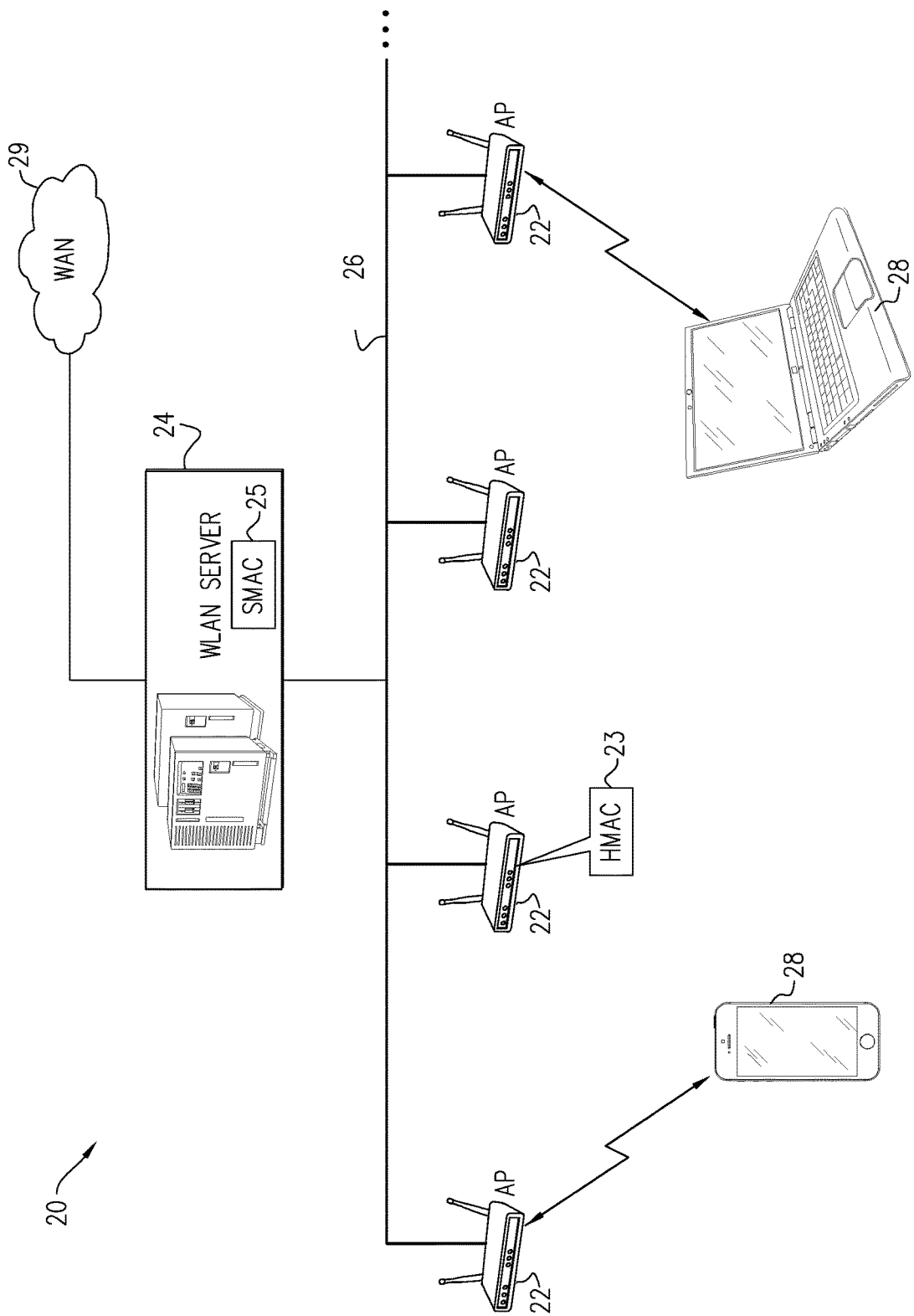
FIG. 1 is a block diagram that schematically illustrates a WLAN system, in accordance with an embodiment of the invention.

Wi-Fi APs are required by the IEEE 802.11 standards to support a wide range of complex functionalities. At the MAC layer, these functionalities include channel access (i.e., verifying availability of a wireless channel in the WLAN system before transmitting data packets to a STA), packet integrity checking (by computation of the cyclical redundancy code [CRC]), and transmission of packet acknowledgments, as well as association, authentication, scheduling, maintaining client buffers and queues, and packet fragmentation and aggregation. The channel access, integrity checking, and acknowledgment functions are time critical, and must typically be completed within time frames of 10 µs or less in order to meet the requirements of the 802.11 standards.

In many APs, the time-critical MAC functions (along with PHY functions) are performed by dedicated hardware logic chips, while the remaining MAC-layer functions are performed by a programmable host processor under the control of software or firmware. The host processor may also carry out management functions and support higher-layer protocols used in Internet communications. The host processor and associated resources, such as memory and interfaces, thus enable the AP to flexibly perform a range of computational and communication tasks; but they add substantially to the complexity, cost and power consumption of the AP.

Embodiments of the present invention that are described herein address this problem by transferring the portion of the MAC-layer functionality that is not time-critical—and can readily be carried out in software—from the APs to a central WLAN server. The APs are connected to the server over fast, wired LAN links, for example high-speed Ethernet links, and typically contain only the hardware components needed for time-critical WLAN functions, such as channel access, CRC checking, and acknowledgment. Consequently, the APs are simplified and inexpensive and electrical power is reduced, in comparison with APs that are known in the art. (This low power budget enables the APs, in some embodiments, to draw their electrical power from the cabling of the wired LAN that connects them to the WLAN server, for instance using Power Over Ethernet techniques.)

The disclosed embodiments thus provide a WLAN system comprising multiple APs, all connected via respective backbone network interfaces to a WLAN server over a wired LAN. A single WLAN server of this sort is capable of serving the entire WLAN system. Each AP comprises a wireless transceiver, which transmits and receives data packets over the air to and from STAs in the system and performs the sorts of time-critical MAC functions that are noted above. When an AP transceiver receives an uplink packet from a STA, it performs these time-critical functions and passes the packet to encapsulation logic in the AP. The encapsulation logic encapsulates the data packet, including the MAC headers and payloads of the packets, in data frames and transmits the data frames over the wired LAN to the WLAN server.

The WLAN server comprises its own encapsulation logic, which decapsulates the data packets from the data frames received from the APs. A MAC processor in the WLAN server then applies higher-level MAC processing functions that are less time-critical, such as association, authorization, authentication, scheduling, buffering, queuing, fragmentation and aggregation, to the MAC headers and payloads of the decapsulated data packets. Among other functions, the WLAN server generates data packets for transmission by the access points over the air to the STAs with respect to processes of association, authorization and authentication (AAA).

The MAC processor in the WLAN server also applies its MAC processing capabilities in generating the MAC headers of the data packets that are to be transmitted by the access points over the air to the STAs. The encapsulation logic in the WLAN server encapsulates these downlink data packets, including the MAC headers, in data frames and transmits them over the wired LAN to the APs. The APs decapsulate the packets and transmit them, via the wireless transceivers, to the destination STAs. Additionally or alternatively, the MAC processor in the WLAN server performs PHY-level computational functions, such as generating encoding and beamforming instructions, and conveys these instructions to the APs together with the data packets for transmission.

In some embodiments, the MAC processor is implemented in software that runs on the WLAN server. In one embodiment, multiple instances of the MAC processor software run concurrently on the WLAN server, with one instance corresponding to each AP. The encapsulation logic routes packets received from each MAC processor instance to its corresponding AP and vice versa. In an alternative embodiment, only one instance of the MAC processor runs on the WLAN server, and it maintains multiple contexts, one corresponding to each AP. The MAC processor internally switches the context based on the AP with which it is communicating.

The disclosed embodiments enable the cost of the entire WLAN system to be reduced substantially, due to both the simplification of the APs and the centralization of computing resources in the WLAN server. Multiplexing the computing resources of the WLAN server among the APs reduces the total computing power required in the system, and also simplifies the installation, configuration, and maintenance of the APs. Software upgrades, when needed, are performed centrally on the WLAN server. Furthermore, because the pared-down APs can be powered over the cabling of the wired LAN, the power infrastructure of the system is simplified.

Centralization of AP control functions in the server also enables enhanced management and load balancing of large wireless networks, including both enterprise networks and urban carrier networks. In some embodiments, for example, the MAC processor receives and collects information from the APs regarding respective locations of the STAs in the WLAN system, and thus selects the APs to transmit the data packets to the STAs based on the respective locations and communication loads of the APs. As STAs roam within the coverage area of the network, the WLAN server facilitates handover of the STAs from one AP to another.

The WLAN server can also carry out multi-AP coordination functions, for example providing a simple and secure implementation of the functions defined in the above-mentioned Multi-AP Specification, as well as implementing multiple-input multiple-output (MIMO) schemes that use the antennas of multiple access points cooperatively.

FIG. 1 is a block diagram that schematically illustrates a WLAN system 20, in accordance with an embodiment of the invention. System 20 comprises multiple APs 22, which communicate with a WLAN server 24 over a wired LAN 26, such as an Ethernet network. APs 22 transmit and receive data packets, comprising respective PHY and MAC headers and payloads, over the air to and from STAs 28 in system 20. APs 22 have respective basic service sets (BSSs) and are configured to associate with the STAs, using the respective BSSs, in response to instructions conveyed over wired LAN 26 from WLAN server 24 to the access points. WLAN server 24 further comprises a wide area network (WAN) interface (shown in FIG. 2), which is coupled to a public WAN 29, and enables the WLAN server to convey communications between STAs 28 and WAN 29 via APs 22.

As explained earlier, the MAC-layer functions mandated by the IEEE 802.11 standards are divided in system 20 between APs 22 and WLAN server 24. The MAC functions of APs 22 are identified for convenience as "hardware MAC" (HMAC) functions 23, because they are typically implemented in hardware logic; whereas those of WLAN server 24 are identified as software MAC (SMAC) functions 25. In the present example, HMAC functions 23 include channel access, integrity checking, and acknowledgment functions, inter alia, while SMAC functions include association, authentication, scheduling, buffering, queuing, fragmentation and aggregation. Alternatively, other divisions of HMAC and SMAC functions 23 and 25 are possible, depending on system capabilities and requirements. Furthermore, although the terms "HMAC" and "SMAC" are used for convenience to distinguish the MAC-layer functions of APs 22 from those of WLAN server 24, certain of the HMAC functions may be performed in software, and certain SMAC functions may be implemented in dedicated or programmable hardware logic. All such alternative divisions of functions and implementation are considered to be within the scope of the present invention.

Figure 2:
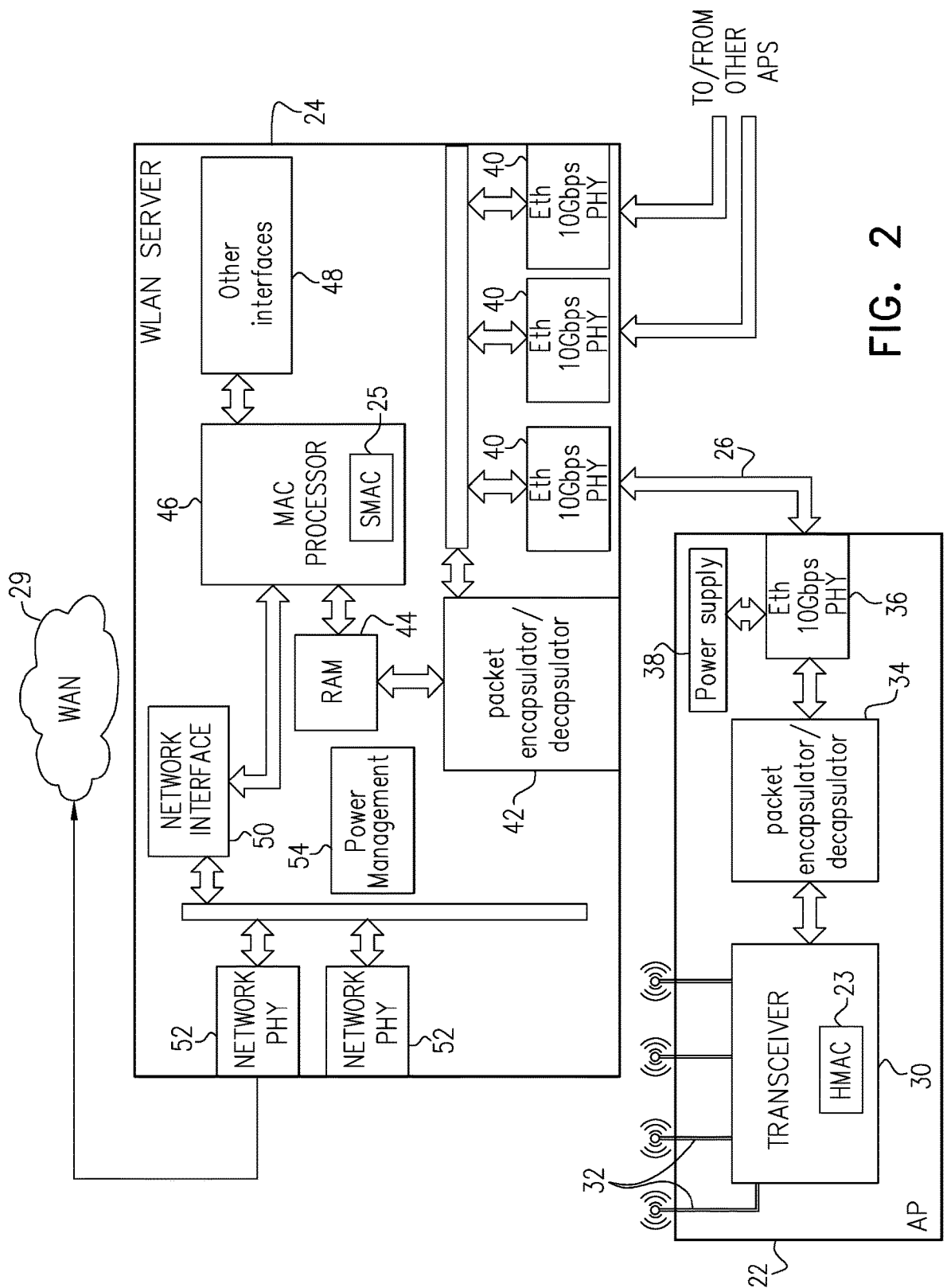
FIG. 2 is a block diagram that schematically shows details of a WLAN server and access point in the system of FIG. 1, in accordance with an embodiment of the invention.

FIG. 2 is a block diagram that schematically shows details of WLAN server 24 and AP 22, in accordance with an embodiment of the invention.

Figure 3:
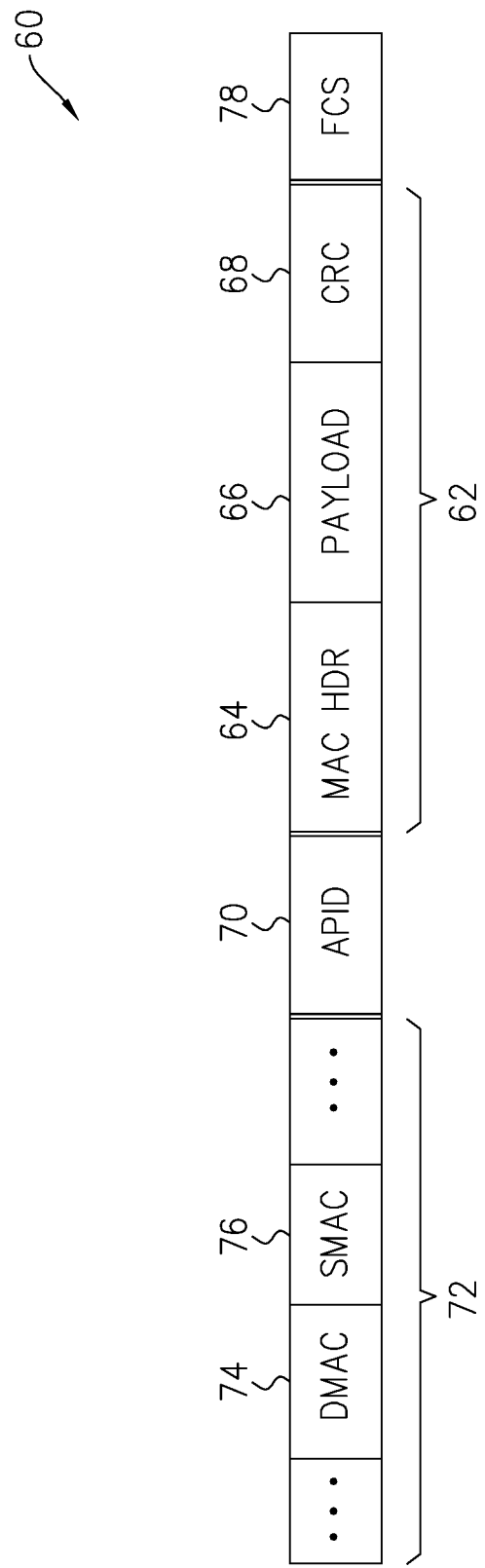
FIG. 3 is a block diagram that schematically illustrates a data frame transmitted between an access point and a WLAN server, in accordance with an embodiment of the invention.

AP 22 comprises a wireless transceiver 30, which comprises a PHY interface coupled to antennas 32, as specified by the applicable 802.11 standards, as well as a MAC interface implementing HMAC functions 23. Transceiver 30 transmits and receives data packets via antennas 32 to and from STAs 28 in system 20. Packet encapsulation logic 34 encapsulates the uplink packets received by transceiver 30, including both the MAC headers and payloads of the packets, in data frames and passes the data frames to a backbone network interface 36 for transmission via LAN 26 to WLAN server 24. An example of an encapsulated packet of this sort is shown in FIG. 3.

In the system configuration that is shown in FIG. 2, LAN 26 comprises a high-speed Ethernet network, for example a 10 Gbps Ethernet network, which enables WLAN server 24 to rapidly receive and handle encapsulated packets from AP 22. The Ethernet network link is also useful in enabling a power supply 38 in AP 22 to draw electrical power from the cabling of LAN 26, using standardized Power over Ethernet (PoE) technology. Alternatively, LAN 26 may comprise a different sort of network, with or without the capability of providing electric power to AP 22. In an alternative embodiment, the low power consumption of AP 22 makes it possible to operate AP 22 on battery power.

In general, the components of AP 22 are implemented in dedicated or programmable hardware logic circuits, on a single integrated circuit chip or a set of two or more chips. Alternatively or additionally, at least some of the functions of AP 22, including HMAC functions 23, may be carried out by a programmable processor under the control of software or firmware.

WLAN server 24 comprises one or more backbone network interfaces 40 for connection to network 26. In the pictured example, network 26 comprises a separate, respective link between WLAN server 24 and each of APs 22; but alternatively, the WLAN server may be connected to the APs via a suitable switch. Encapsulation logic 42 in WLAN server 42 decapsulates the uplink packets from the Ethernet frames in which APs 22 transmitted them and saves the packets in a random access memory (RAM) 44. A MAC processor 46 applies SMAC functions 25 to the MAC headers and payloads of the decapsulated data packets.

MAC processor 46 typically comprises a general-purpose computer processor, which is programmed in software to carry out SMAC functions 25 and other functionality that is described herein. The software may be downloaded to WLAN server 24 in electronic form, over a network, for example. Additionally or alternatively, the software may be stored on tangible, non-transitory computer-readable media, such as optical, magnetic, or electronic memory. MAC processor 46 also interacts with other interfaces 48, such a bus interfaces (for example, PCIe and/or USB interfaces), as well as user interface components. For communications with WAN 29, as well as other networks, WLAN server 24 comprises a network interface controller 50, which connects to one or more physical network ports 52. A power management controller 54 provides electrical power to the MAC processor and other components of WLAN server 24.

FIG. 3 is a block diagram that schematically illustrates a data frame 60 that is transmitted between one of APs 22 and WLAN server 24, in accordance with an embodiment of the invention. Data frame 60 encapsulates as its payload an uplink packet 62 that AP 22 received over the air from one of STAs 28, including a MAC header 64, payload 66, and CRC 68. Encapsulation logic 34 appends an access point identifier (APID) 70 to packet 62, identifying the AP that received packet 62. Data frame 60 itself is a standard Ethernet frame, with a header 72 including a destination MAC address (DMAC) 74 of WLAN server 24 and a source MAC address (SMAC) 76 of AP 22. Data frame 60 concludes with a frame check sequence (FCS) 78.

Figure 4:
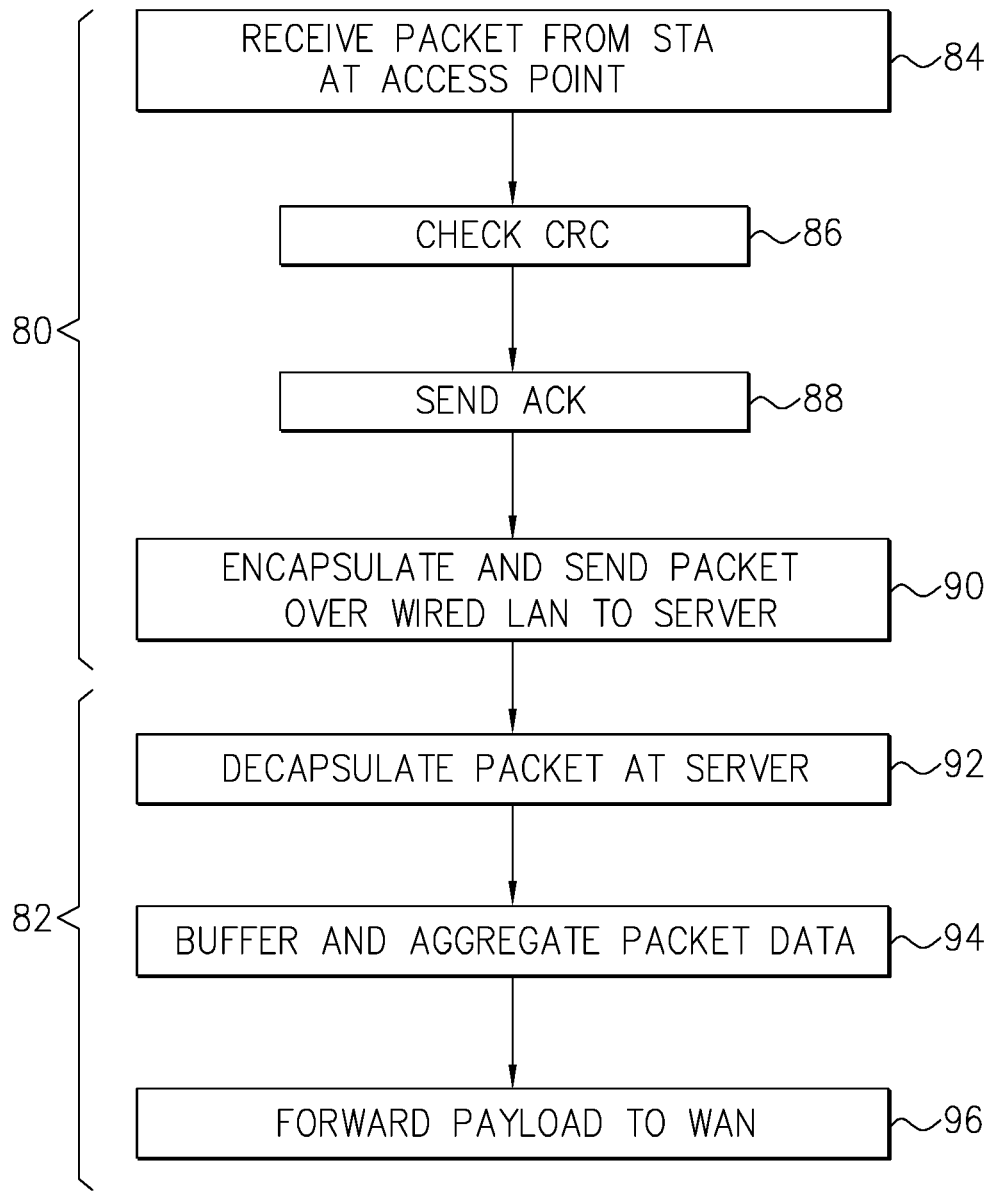
FIG. 4 is a flow chart that schematically illustrates a method for processing an uplink packet transmitted in a WLAN, in accordance with an embodiment of the invention.

FIG. 4 is a flow chart that schematically illustrates a method for processing an uplink packet transmitted from one of STAs 28 to one of APs 22, in accordance with an embodiment of the invention. The processing chain is divided into two stages: a local stage 80, including HMAC functions 23, which is performed by AP 22; and a centralized stage 82, which is performed by WLAN server 24. Before carrying out this process, STA 28 typically will have associated with the BSS of AP 22, and the credentials of STA 28 will have been authenticated. These preliminary steps are carried out by exchange of the required messages between STA 28 and AP 22, under the control of SMAC functions 25 of MAC processor 46 (FIG. 2).

In local stage 80, transceiver 30 (FIG. 2) receives the uplink packet, for example packet 62 (FIG. 3), at a packet reception step 84. As a part of HMAC functions 23, transceiver 30 verifies the integrity of packet 62 by checking CRC 68, at an error checking step 86. If the CRC is erroneous, transceiver 30 discards the packet and may transmit a request to STA 28 to retransmit the packet in whole or in part, in accordance with the protocols according to which transceiver 30 operates. (Alternatively or additionally, transceiver may implement a PHY-level retransmission protocol.) If an acknowledgment of the packet is required, transceiver 30 transmits the acknowledgment to STA 28, at an acknowledgment step 88. Encapsulation logic 34 then encapsulates packet 62 in frame 60, and transmits frame 60 over LAN 26 via network interface 36, at a packet encapsulation step 90.

Centralized stage 82 begins with reception of frame 60 by WLAN server 24 at network interface 40. Encapsulation logic 42 decapsulates packet 62, at a decapsulation step 92, and writes the packet to a buffer in RAM 44. To the extent that payload 66 is part of a multi-packet message, SMAC functions 25 of MAC processor 46 aggregate the packet payloads 66, at an aggregation step 94. When payloads 66 contain a message for transmission to WAN 29, MAC processor 46 assembles the payloads into a suitable packet, for example an Internet Protocol (IP) packet with an appropriate transport header, and forwards the packet to WAN 29, at a forwarding step 96.

Figure 5:
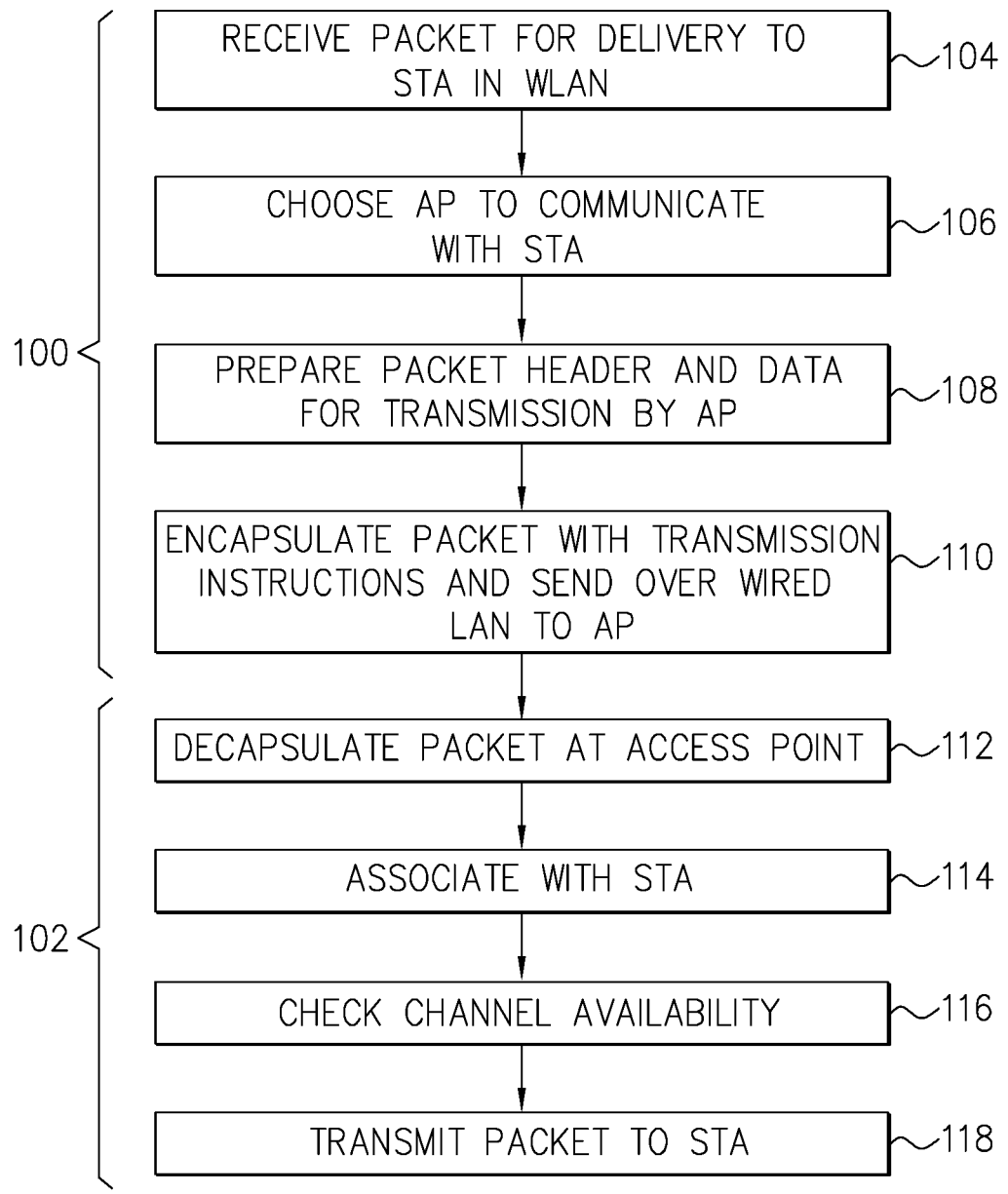
FIG. 5 is a flow chart that schematically illustrates a method for generating and transmitting a downlink packet in a WLAN, in accordance with an embodiment of the invention.

FIG. 5 is a flow chart that schematically illustrates a method for generating and transmitting a downlink packet to STA 28, in accordance with another embodiment of the invention. This method likewise comprises a centralized stage 100, performed by WLAN server 24, and a local stage 102, performed by one of APs 22.

Centralized stage 100 in this example is initiated when WLAN server 24 receives a packet from WAN 29 for delivery to one of STAs 28, at a packet reception step 104. As a part of SMAC functions 25, MAC processor 46 buffers the packet in RAM 44, and if necessary, fragments the packet data into smaller segments, to be transmitted in a sequence of two or more downlink packets over the air to STA 28.

MAC processor 46 chooses one of APs 22 to transmit the packet or packets to STA 28, at an AP selection step 106. When STA 28 is already associated with a given AP 22 (for example as indicated by APID 70 of an uplink packet conveyed previously to WLAN server 24), MAC processor 46 may simply assign the same AP for the downlink transmission. On the other hand, MAC processor 46 may alternatively choose another AP, based on considerations of load balancing, for example, or on the estimated location of STA 28 in WLAN system 20. In one embodiment, the location is inferred from measurements of signal strength made by APs 22 of uplink transmissions from this STA 28. Additionally or alternatively, MAC processor 46 uses beamforming information received from APs 22 in choosing the AP or APs that are to communicate with each STA 28.

After choosing AP 22, SMAC functions 25 of MAC processor 46 prepare the MAC headers and data payloads of the downlink packets for transmission by the chosen AP, at a packet preparation step 108. In some embodiments, MAC processor 46 also generates instructions with respect to PHY-level functions of transceiver 30 in AP 22, such as encoding and beamforming, to be applied by transceiver 30 in transmitting data packets to the destination STA 28. If necessary, SMAC functions 25 of MAC processor 46 queue the downlink packets in RAM 44 and schedule the packets for transmission by the chosen AP 22, depending upon network load and quality of service (QoS) considerations. MAC processor 46 conveys to AP 22, together with the data packets for transmission over the air to STA 28, instructions with respect to encoding, beamforming and quality of service (QoS) for application by transceiver 30 in transmitting the data packets to the STA. Encapsulation logic 42 then encapsulates the downlink packets in Ethernet frames, in a manner similar to that illustrated in FIG. 3, and sends the frames over network 26 to the chosen AP 22 (along with PHY-level and other control instructions if applicable), at a frame transmission step 110.

Local stage 102 begins when AP 22 receives the frame from network 26 via network interface 36. Encapsulation logic 34 decapsulates the downlink packet from the frame, including the MAC header generated by MAC processor 46, at a decapsulation step 112. If the chosen AP 22 is not already associated with the destination STA 28, transceiver 30 carries out the required process of association and authentication (under control of SMAC functions 25), at an association step 114. HMAC functions 23 in transceiver 30 then assess the availability of a wireless channel to STA 28, at a channel availability checking step 116. This step typically includes the clear channel assessment (CCA) procedure defined by the IEEE 802.11 standards. Additionally or alternatively, transceiver 30 transmits a request-to-send (RTS) packet to STA 28 and waits to receive a clear-to-send (CTS) response, as an indication that the wireless channel is available. When the channel is available, transceiver 30 transmits the downlink packet to STA 22, at a downlink transmission step 118.

It is appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A wireless local area network (WLAN) system, comprising:
    a plurality of access points, each access point comprising:
        a wireless transceiver, which is configured to transmit and receive data packets, comprising respective medium access control (MAC) headers and payloads, over the air to and from client stations (STAs) in the WLAN system;
        a first backbone network interface, which is configured to be connected to a wired local area network (LAN); and
        first encapsulation logic, which is configured to encapsulate the data packets received by the wireless transceiver, including the MAC headers and payloads, in data frames and to transmit the data frames over the LAN via the first backbone network interface; and
    a WLAN server, comprising:
        a second backbone network interface, which is configured to be connected to the wired LAN and to receive the data frames transmitted over the wired LAN from the access points;
        second encapsulation logic, which is configured to decapsulate the received data packets from the received data frames; and
        a MAC processor, which is configured to apply MAC processing functions to the MAC headers and payloads of the decapsulated data packets.

2. The system according to claim 1, wherein the wireless transceiver is configured, upon receiving a data packet from a STA, to transmit an acknowledgment packet over the air to the STA while the encapsulation logic encapsulates the received data packet for transmission over the LAN.

3. The system according to claim 2, wherein the data packets comprise an error detection code, and wherein the access point is further configured to verify an integrity of the received data packet using the error detection code.

4. The system according to claim 1, wherein the MAC processor is further configured to apply the MAC processing functions in order to generate the MAC headers of the data packets that are to be transmitted by the access points over the air to the STAs, and the second encapsulation logic is configured to encapsulate the data packets, including the generated MAC headers, in further data frames for transmission over the wired LAN to the access points,
    wherein the first encapsulation logic is configured to decapsulate the further data frames received by the first backbone network interface from the wired LAN, and to pass the decapsulated data packets, including the generated MAC headers, to the wireless transceiver for transmission to a STA.

5. The system according to claim 4, wherein the MAC processor is configured to receive information from the access points regarding respective locations of the STAs in the WLAN system, and to select the access points to transmit the data packets to the STAs responsively to the respective locations.

6. The system according to claim 4, wherein the MAC processor is configured to convey to the access points, together with the data packets for transmission over the air to the STAs, instructions with respect to encoding, beamforming and quality of service (QoS) for application by the wireless transceiver in transmitting the data packets to the STAs.

7. The system according to claim 4, wherein the wireless transceiver is configured to assess an availability of a wireless channel in the WLAN system before transmitting the data packets to the STAs.

8. The system according to claim 1, wherein the access points are configured to draw electrical power, via the first backbone network interface, from cabling of the wired LAN.

9. The system according to claim 1, wherein the access points have respective basic service sets (BSSs) and are configured to associate with the STAs, using the respective BSSs, in response to instructions conveyed over the wired LAN from the WLAN server to the access points.

10. The system according to claim 1, wherein the WLAN server further comprises a wide area network (WAN) interface, which is configured to be coupled to a public network, and the MAC processor is configured to convey communications between the STAs and the public network via the access points.

11. A method for communicating over a wireless local area network (WLAN), the method comprising:
    coupling a plurality of access points to communicate over a wired local area network (LAN) with a WLAN server, each access point comprising a wireless transceiver configured to transmit and receive data packets, comprising respective medium access control (MAC) headers and payloads, over the WLAN to and from client stations (STAs);
    in each of the access points, encapsulating the data packets received by the wireless transceiver from the STAs, including the MAC headers and payloads, in data frames, and transmitting the data frames over the wired LAN to the WLAN server;
    in the WLAN server, decapsulating the received data packets from the received data frames; and applying MAC processing functions to the MAC headers and payloads of the decapsulated data packets in the WLAN server.

12. The method according to claim 11, and comprising, upon receiving a data packet from a STA, transmitting an acknowledgment packet from the wireless transceiver over the air to the STA while the encapsulation logic encapsulates the received data packet for transmission over the LAN.

13. The method according to claim 12, and comprising verifying an integrity of the received data packet in the wireless transceiver using an error detection code in the received data packet.

14. The method according to claim 11, and comprising:
further applying the MAC processing functions in the WLAN server in order to generate the MAC headers of the data packets that are to be transmitted by the access points over the air to the STAs;
encapsulating the data packets that are to be transmitted by the access points, including the generated MAC headers, in further data frames for transmission from the WLAN server over the wired LAN to the access points;
decapsulating the further data frames received by the access points from the wired LAN; and
transmitting the decapsulated data packets, including the generated MAC headers, by the wireless transceiver to a STA.

15. The method according to claim 14, and comprising receiving, at the WLAN server, information from the access points regarding respective locations of the STAs, and to selecting the access points to transmit the data packets to the STAs responsively to the respective locations.

16. The method according to claim 14, and comprising conveying from the WLAN server to the access points, together with the data packets for transmission over the air to the STAs, instructions with respect to encoding, beamforming and quality of service (QoS) for application by the wireless transceivers in transmitting the data packets to the STAs.

17. The method according to claim 14, wherein transmitting the decapsulated data packet comprises assessing, by the wireless transceiver, an availability of a wireless channel in the WLAN before transmitting the data packets to the STAs.

18. The method according to claim 11, wherein coupling the plurality of the access points comprises providing electrical power to the access points from cabling of the wired LAN.

19. The method according to claim 11, wherein the access points have respective basic service sets (BSSs), and the method comprises associating the access points with the STAs, using the respective BSSs, in response to instructions conveyed over the wired LAN from the WLAN server to the access points.

20. The method according to claim 11, and comprising generating by the WLAN server data packets for transmission by the access points over the air to the STAs with respect to processes of association, authorization and authentication (AAA).

\* \* \* \* \*